US005330153A

United States Patent [19]

Reiter

[11] Patent Number: 5,330,153

[45] Date of Patent: Jul. 19, 1994

[54] ELECTROMAGNETICALLY OPERABLE VALVE

[75] Inventor: Ferdinand Reiter, Markgroeningen, Fed. Rep. of Germany

[73] Assignee: Robert Bosch GmbH, Stuttgart, Fed. Rep. of Germany

[21] Appl. No.: 915,990

[22] PCT Filed: Jan. 21, 1991

[86] PCT No.: PCT/DE91/00052

§ 371 Date: Aug. 3, 1992

§ 102(e) Date: Aug. 3, 1992

[87] PCT Pub. No.: WO91/11605

PCT Pub. Date: Aug. 8, 1991

[30] Foreign Application Priority Data

Feb. 3, 1990 [DE] Fed. Rep. of Germany ....... 4003229

[51] Int. Cl.[5] .......................... F16K 31/06; B05B 1/32

[52] U.S. Cl. ............................ 251/129.21; 239/585.4

[58] Field of Search ................ 251/129.21; 239/585.1, 239/585.4, 585.5

[56] References Cited

U.S. PATENT DOCUMENTS 4,915,350 4/1990 Babitzka et al. ........... 251/129.21 X

*Primary Examiner*—John Rivell

*Attorney, Agent, or Firm*—Edwin E. Greigg; Ronald E. Greigg

[57] ABSTRACT

An electromagnetically operable valve having a core which is surrounded by a magnet coil and having an armature by means of which a valve closing body which interacts with a stationary valve seat is operated, the magnet coil is at least partially surrounded by a metallic housing jack, which closes the magnetic circuit, is closely connected at its upper end to the core and connected at its lower end to the connecting part, and overhangs the magnet coil at least in the axial direction. This valve is particularly suitable for an injection valve in a fuel injection system.

19 Claims, 1 Drawing Sheet

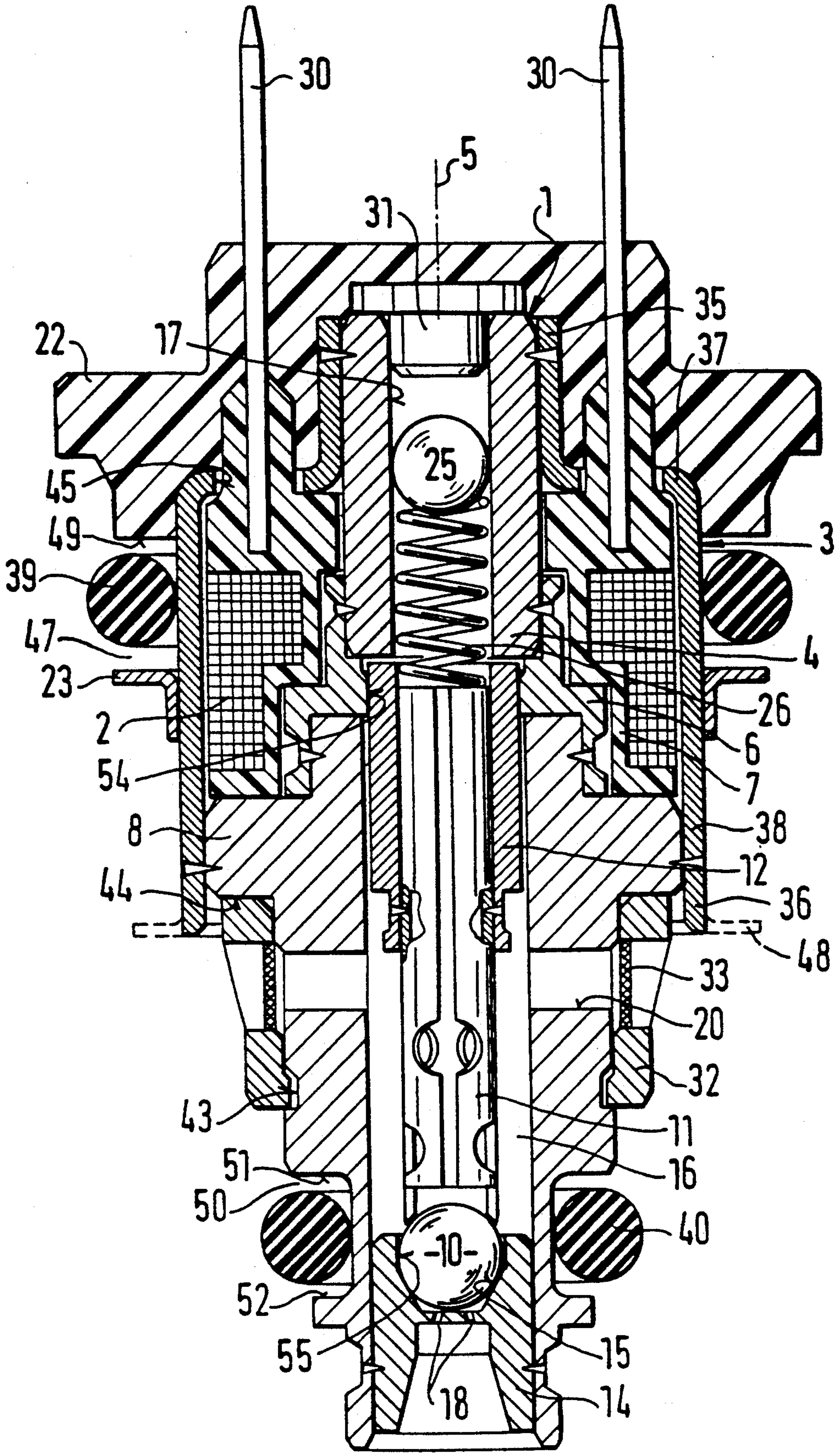
30
30
5
31
1
35
22
17
37
25
45
49
3
39
47
4
23
26
2
6
54
7
8
38
12
44
36
48
33
20
32
43
11
16
51
50
40
-10-
52
55
15
18
14

ELECTROMAGNETICALLY OPERABLE VALVE

PRIOR ART

The invention is based on an electromagnetically operable valve as set forth hereinafter. An electromagnetically operable valve has already been proposed (German Patent Application P 38 25 135.3) in which, however, the magnet coil is surrounded over its circumference only partially by at least one clip-shaped guide element which is used for guiding the magnetic field lines. In addition, plastic material of a plastic extrusion coating is located in the gap formed between the magnet coil and the guide element. The magnetic field, which is of unfavourable construction, results in a high magnetic stray flux and hence a high energy requirement which has to be applied to open the valve. The central fuel supply, in conjunction with the bent electrical connecting plug, prevents contact being made with a plurality of valves by means of a common plug strip, and prevents a plurality of valves being arranged one behind the other in a series circuit.

ADVANTAGES OF THE INVENTION

The valve according to the invention, has the advantage of a compact valve with a compact magnetic circuit. A short path of the closed field lines which form the magnetic field, and the surrounding housing jacket reduce the magnetic stray flux and hence increase the ratio, which is critical for the energy which has to be used, between the useful flux and the stray flux, so that a smaller energy requirement is necessary to open the valve. The housing jacket makes possible a compact and simple structural shape of the valve, and hence also cost-effective assembly during production.

Advantageous developments and improvements of the valve specified herein are possible by means of the measures outlined hereinafter.

It is particularly advantageous if the metallic housing jacket is closely connected to the connecting part by welding, since the necessary seal between the housing jacket and the connecting part is thus formed at the same time.

It is likewise advantageous if the housing jacket is produced by deep drawing and abuts closely against the core at its upper end and against the connecting part at its lower end, so that detrimental air gaps are avoided and, in addition, welding is simplified.

It is also advantageous if the housing jacket exhibits a housing shoulder which points outwards and, together with an end surface of the plastic sheath pointing in the direction of the housing shoulder, forms the side surfaces of an annular groove whose groove base is formed by the circumference of the housing jacket. The housing shoulder prevents a sealing ring mounted on the circumference of the housing jacket from remaining in a valve holder and from sliding of the jacket housing when the valve is removed from said valve holder.

In order to prevent the sealing ring sliding off the housing jacket, it is likewise advantageous if an annular groove is provided on the circumference of the housing jacket, whose radially extending side surfaces are formed by an end surface of the plastic sheath pointing in the direction of the armature and an end surface of a drawing ring, which is pulled onto the housing jacket, the base of which groove is formed by the circumference of the housing jacket.

It is particularly advantageous if at least one radial lateral opening, which is used as the fuel inlet and is connected to a valve space extending as far as the valve seat, is constructed between an upper sealing ring on the housing jacket and a lower sealing ring on the connecting part. The fuel supply from the side and the axially arranged electrical connecting plugs allow the fuel to flush through a plurality of valves which are arranged one behind the other, in series, complete integration of a plurality of valves in holders of the internal-combustion engine induction pipe, and the common electrical contact by means of a common plug strip.

DRAWING

An exemplary embodiment of the invention is shown in a simplified manner in the drawing and is explained in more detail in the following description.

DESCRIPTION OF THE EXEMPLARY EMBODIMENT

The electromagnetically operable valve shown by way of example in the drawing, in the form of an injection valve for fuel injection systems of internal-combustion engines, has a hollow core 1, which is partially surrounded by a magnet coil 2 which exhibits a coil former 7, which is stepped in the radial direction, and is provided with a winding, which is stepped in the radial direction. Adjacent to a lower core end 4 of the core 1, a hollow intermediate part 6 is closely connected by welding to said core end 4, concentrically with respect to a valve longitudinal axis 5. At its end facing away from the core 1, the intermediate part 6 is closely welded to a tubular, cylindrical connecting part 8. The arrangement of the core 1, the intermediate part 6 and the connecting part 8 in a row thus represents a rigid metallic unit.

In the direction of the valve longitudinal axis 5, a ball element 25, which preferably has a hardened surface, is pressed into a core bore 17 of the core 1, the pressing-in depth of which ball element 25 determines the spring force of a restoring spring 26 which abuts directly against the ball element 25. At its end facing away from the ball element 25, the restoring spring 26 is supported on an end side of a connecting tube 11, which is connected by welding at its end facing the core 1 to an armature 12, which is at the same time used as a radial guide for the restoring spring 26. A valve closing body 10, which is constructed as a ball and interacts with a stationary valve seat 15, is attached by welding to the end of the connecting tube 11 facing away from the armature 12.

A valve seating body 14, exhibiting the stationary valve seat 15, is closely connected by welding to the connecting part 8. Downstream from the conically running valve seat 15, at least one spray opening 18 is constructed in the valve seating body 14.

A metallic housing jacket 3, which closes the magnetic circuit, is produced from sheet metal by deep-drawing or pressing, and engages around the core 1 at an upper end 35 having a relatively small diameter, surrounds the core 1 at least partially, the magnet coil 2 completely, and a part of the connecting part 8, in the axial direction. The housing jacket 3 is closely connected at its upper end 35 to the core 1, at least by spot welding, and is closely connected at its lower end 36 to the connecting part 8, by welding. In order to avoid air gaps, the housing jacket 3 is constructed such that it abuts closely against the core 1 at its upper end 35 and against the connecting part 8 at its lower end 36. Originating from the upper end 35, engaging on the outside around the magnet coil 2, a base 37 of the housing jacket 3 extends in the radial direction to the cylindrical jacket part 38, which has a relatively large diameter, at the lower end 36.

In the exemplary embodiment shown, between an upper sealing ring 39 on the jacket part 38 of the housing jacket 3, and a lower sealing ring 40 on the connecting part 8, the connecting part 8 has at least one radial lateral opening 20 which is used as the fuel inlet and is connected to the valve space 16, which extends as far as the valve seat 15, inside the connecting part 8. In the case of the present exemplary embodiment, the lateral opening 20 is constructed in the connecting part 8, but it can also run at the level of the jacket part 38.

A supporting ring 32, which exhibits a fuel filter 33 via which fuel can flow through the lateral opening 20, is held by means of a groove 43 in the connecting part 8 and by means of a step 44 on the connecting part 8.

The coil former 7 of the magnet coil 2 is produced by plastic extrusion coating, by means of which the electrical connecting plugs 30, which are required to make contact with the magnet coil 2, are extruded at the same time, so that an independent plastic injection moulding is formed. This plastic injection moulding is inserted into the housing jacket 3 in such a manner that it abuts on the base 37 and the connecting plugs 30 project through through-openings 45 in the base 37 to the exterior, approximately parallel to the valve longitudinal axis 5 in the direction towards the upper end 35.

The core bore 17 is sealed by a plastic plug 31 at its end facing away from the valve closing body 10, so that, during injection moulding of a plastic sheath 22, which surrounds the end of the valve facing away from the valve seating body 14, at the base 37, and a part of the connecting plugs 30, no liquid plastic can pass into the core hole 17. The plastic sheath 22 extends radially beyond the base 37. The core hole 17 is sealed with respect to the fuel located inside the valve by means of the ball element 25 which is pressed into the core hole 17.

Provided on the circumference of the jacket part 38 of the housing jacket 3 is an annular groove 47 whose radially extending side surfaces are formed by the end surface 49 of the plastic sheath 22 pointing in the direction of the armature and the end surface of a drawing ring 23, which is pulled onto the jacket part 38 and exhibits, for example, an L-shaped cross-sectional shape, the base of said annular groove 47 being formed by the circumference of the jacket part 38. When the valve is being removed from a holder, which is not shown, in the induction pipe of an internal-combustion engine, the drawing ring 23 ensures that an upper sealing ring 39 which is mounted in the annular groove largely maintains its axial position on the circumference of the jacket part 38 and does not remain in the holder of the induction pipe.

Another embodiment according to the invention comprises the jacket part 38 exhibiting a housing shoulder 48, which is shown by dashed lines, points outwards and, together with the end surface of the plastic sheath 22 pointing in the direction of the housing shoulder 48, forms the side surfaces of the annular groove 47 whose groove base is formed by the circumference of the jacket part 38. This solution also results in an upper sealing ring 39, which is mounted on the circumference of the jacket part 38, not remaining in a holder of the induction pipe when the valve is removed from said holder.

The lower sealing ring 40 is held on the connecting part 8 in a lower annular groove 50 which is bounded by two shoulders 51, 52 of the connecting part 8, which run radially outwards at an axial distance from one another.

The armature 12 is guided in a sliding opening 54 of the intermediate part 6, while the valve closing body 10 is supported in a guiding opening 55 of the valve seating body 14 such that it can slide.

The valve having the metallic housing jacket 3 which closes the magnetic circuit not only makes possible a compact magnetic field which requires only a small energy requirement to open the valve but also makes possible a compact and simple construction. In conjunction with the axial connecting plugs 30 and the radial fuel inlet, valves according to the invention allow the series connection of a plurality of valves arranged one behind the other as well as allowing electrical contact to be made with them in a common manner by means of a common plug strip.

The foregoing relates to a preferred exemplary emobodiment of the invention, it being understood that other variants and emobodiments thereof are possible within the spirit and scope of the invention, the latter being defined by the appended claims.

I claim:

1. An electromagnetically operable injection valve for fuel injection systems of internal-combustion engines, having a core (1) coaxial with a longitudinal axis (5) of said valve, said core having a first end and a second end, said core is surrounded by a magnet coil which is part of a magnetic circuit, an armature (12) connected to a valve closing body by means of which said valve closing body (10) is operated to interact with a stationary valve seat (15), a tubular metallic intermediate part (6) having a first end and a second end, said first end of said intermediate part is closely connected to said second end of the core facing the armature and said second end of said intermediate part is connected to a tubular connecting part (8), a metallic valve seating body (14) which includes the stationary valve seat (15), said valve seating body is attached to tubular connecting part at a lower end facing away from the intermediate part, and having a plastic sheath (22) which surrounds an upper end of the valve facing away from the valve seating body, the valve is at least partially surrounded in a direction of the longitudinal axis of the valve and is completely surrounded in a circumferential direction by a metallic housing jacket (3) which closes the magnetic circuit, the metallic housing jacket is connectd to said first end of the core (1) at an upper end (35) and to the connecting part (8) at a lower end (36),and overhangs the magnet coil (2) at least in the axial direction.

2. A valve according to claim 1, in which the metallic housing jacket (3) is closely connected to the connecting part (8) by welding.

3. A valve according to claim 1, in which the housing jacket (3) is produced by deep drawing and abuts closely against the core (1) at the upper end (35), and against the connecting part (8) at the lower end (36).

4. A valve according to claim 2, in which the housing jacket (3) is produced by deep drawing and abuts closely against the core (1) at the upper end (35), and against the connecting part (8) at the lower end (36).

5. A valve according to claim 1, in which the housing jacket (3) exhibits a housing shoulder (48) which points outwards and, together with an end surface (49) of the plastic sheath (22) pointing in a direction of the housing shoulder (48), forms side surfaces of an annular groove (47) whose groove base is formed by a circumference of the housing jacket (3).

6. A valve according to claim 2, in which the housing jacket (3) exhibits a housing shoulder (48) which points outwards and, together with an end surface (49) of the plastic sheath (22) pointing in a direction of the housing shoulder (48), forms side surfaces of an annular groove (47) whose grove base is formed by a circumference of the housing jacket (3).

7. A valve according to claim 3, in which the housing jacket (3) exhibits a housing shoulder (48) which points outwards and, together with an end surface (49) of the plastic sheath (22) pointing in a direction of the housing shoulder (48), forms side surfaces of an annular groove (47) whose groove base is formed by a circumference of the housing jacket (3).

8. A valve according to claim 4, in which the housing jacket (3) exhibits a housing shoulder (48) which points outwards and, together with an end surface (49) of theplasticsheath (22) pointing in a direction of the housing shoulder (48), forms side surfaces of an annular groove (47) whose groove base is formed by a circumference of the housing jacket (3).

9. A valve according to claim 1, in which an annular groove (47) whose radially extending side surfaces are formed by an end surface (49) of the plastic sheath (22) pointing in a direction of the armature (12) and an end surface of a drawing ring (23), which is pulled onto the housing jacket (3) is provided on the circumference of the housing jacket (3), a base of said annular groove (47) is formed by a circumference of the housing jacket (3).

10. A valve according to claim 2, in which an annular groove (47) whose radially extending side surfaces are formed by an end surface (49) of the plastic sheath (22) pointing in a direction of the armature (12) and an end surface of a drawing ring (23), which is pulled onto the housing jacket (3) is provided on the circumference of the housing jacket (3), a base of said annular groove (47) is formed by a circumference of the housing jacket (3).

11. A valve according to claim 3, in which an annular groove (47) whose radially extending side surfaces are formed by an end surface (49) of the plastic sheath (22) pointing in a direction of the armature (12) and an end surface of a drawing ring (23), which is pulled onto the housing jacket (3) is provided on the circumference of the housing jacket (3), a base of said annular groove (47) is formed by a circumference of the housing jacket (3).

12. A valve according to claim 4, in which an annular groove (47) whose radially extending side surfaces are formed by an end surface (49) of the plastic sheath (22) pointing in a direction of the armature (12) and an end surface of a drawing ring (23), which is pulled onto the housing jacket (3) is provided on the circumference of the housing jacket (3), a base of said annular grove (47) is formed by a circumference of the housing jacket (3).

13. A valve according to claim 1, in which at least one radial lateral opening (20) which is used as a fuel inlet and is connected to a valve space (16) extending as far as the valve seat (15) is constructed between an upper sealing ring (39) on the housing jacket (3) and a lower sealing ring (40) on the connecting part (8).

14. A valve according to claim 2, in which is at least one radial lateral opening (20) which is used as a fuel inlet and is connected to a valve space (16) extending as far as the valve seat (15) is constructed between an upper sealing ring (39) on the housing jacket (3) and a lower sealing ring (40) on the connecting part (8).

15. A valve according to claim 3, in which at least one radial lateral opening (20) which is used as a fuel inlet and is connected to a valve space (16) extending as far as the valve seat (15) is constructed between an upper sealing ring (39) on the housing jacket (3) and a lower sealing ring (40) on the connecting part (8).

16. A valve according to claim 4, in which at least one radial lateral opening (20) which is used as a fuel inlet and is connected to a valve space (16) extending as far as the valve seat (15) is constructed between an upper sealing ring (39) on the housing jacket (3) and a lower sealing ring (40) on the connecting part (8).

17. A valve according to claim 5, in which at least one radial lateral opening (20) which is used as a fuel inlet and is connected to a valve space (16) extending as far as the valve seat (15) is constructed between an upper sealing ring (39) on the housing jacket (3) and a lower sealing ring (40) on the connecting part (8).

18. A valve according to claim 9, in which at least one radial lateral opening (20) which is used as a fuel inlet and is connected to a valve space (16) extending as far as the valve seat (15) is constructed between an upper sealing ring (39) on the housing jacket (3) and a lower sealing ring (40) on the connecting part (8).

19. A valve according to claim 13, in which at least one radial lateral opening (20) which is used as a fuel inlet and is connected to a valve space (16) extending as far as the valve seat (15) is constructed between an upper sealing ring (39) on the housing jacket (3) and a lower sealing ring (40) on the connecting part (8).

* * * * *